United States Patent
Scheye

(10) Patent No.: US 8,114,213 B2
(45) Date of Patent: Feb. 14, 2012

(54) CONCRETE AND MORTAR ADDITIVE, PROCESS FOR THE PREPARATION THEREOF, AND ITS USE, AS WELL AS CONCRETE OR MORTAR CONTAINING IT

(75) Inventor: Freddie Scheye, Lille Skensved (DK)

(73) Assignee: CEMEX Research Group AG, Brügg (CH)

( * ) Notice: Subject to any disclaimer, the term of this patent is extended or adjusted under 35 U.S.C. 154(b) by 1117 days.

(21) Appl. No.: 11/791,548

(22) PCT Filed: Nov. 24, 2005

(86) PCT No.: PCT/DK2005/000754
§ 371 (c)(1),
(2), (4) Date: May 23, 2007

(87) PCT Pub. No.: WO2006/056205
PCT Pub. Date: Jun. 1, 2006

(65) Prior Publication Data
US 2008/0060555 A1    Mar. 13, 2008

(30) Foreign Application Priority Data
Nov. 25, 2004 (DK) .................................. 2004 01839

(51) Int. Cl.
*C04B 14/10* (2006.01)

(52) U.S. Cl. .................. 106/718; 106/713; 106/737

(58) Field of Classification Search .................. 106/713, 106/718, 737
See application file for complete search history.

(56) References Cited

U.S. PATENT DOCUMENTS

| | | | |
|---|---|---|---|
| 3,832,193 A | 8/1974 | Parsons et al. | |
| 4,060,424 A | 11/1977 | Hofmann | |
| 4,726,713 A | 2/1988 | Tallard | |
| 4,861,378 A | 8/1989 | Watanabe et al. | |
| 4,900,359 A | 2/1990 | Gelbman | |
| 5,223,098 A | 6/1993 | Cluyse et al. | |
| 5,266,538 A * | 11/1993 | Knudson et al. | 501/147 |
| 5,391,228 A | 2/1995 | Carroll et al. | |
| 5,588,990 A | 12/1996 | Dongell | |
| 5,779,785 A | 7/1998 | Payton et al. | |
| 2002/0038616 A1* | 4/2002 | Henrichsen | 106/713 |
| 2003/0047117 A1* | 3/2003 | Ijdo et al. | 106/486 |

FOREIGN PATENT DOCUMENTS

| | | |
|---|---|---|
| EP | 0467483 | 1/1992 |
| GB | 1264190 | 2/1972 |
| JP | 7100822 | 4/1995 |

OTHER PUBLICATIONS

U.S. Patent Application Publication No. 2002/144630 filed Oct. 10, 2002 by Ijdo Wouter et al.

Cyr, M.; Mouret, M.: "Rheological characterization of superplasticized cement pastes containing mineral admixtures: consequences on self-compacting concrete design"; American Concrete Institute, SP-217-16; pp. 241-255, (2003).

* cited by examiner

*Primary Examiner* — Paul Marcantoni
(74) *Attorney, Agent, or Firm* — Cooper & Dunham LLP

(57) ABSTRACT

A self-compacting concrete and mortar additive is prepared, comprising an aqueous suspension matured and stabilized for 1-7 days, preferably 1-2 days, and having a consistency adapted to the dosing equipment used for dosing the additive when mixing concrete or mortar, and having a pH of 6.5-8, preferably 7 and containing 5-30, preferably 8-20, preferably 10-12% by weight of dry solid of a type of clay, consisting of clay minerals selected from the smectite, vermiculite and/or chlorite group.

19 Claims, No Drawings

CONCRETE AND MORTAR ADDITIVE, PROCESS FOR THE PREPARATION THEREOF, AND ITS USE, AS WELL AS CONCRETE OR MORTAR CONTAINING IT

TECHNICAL FIELD

The present invention relates to a concrete and mortar additive, a process for the preparation thereof as well as its use, and concrete or mortar containing the additive.

BACKGROUND OF THE INVENTION

Present-day types of concrete, including HPC (High Performance Concrete) and SCC (Self Compacting Concrete), contain a relatively high amount of fines to ensure an adequate resistance against segregation. In some instances, a high amount of fines is essential from a wish to obtain a certain imperviousness of the construction to water. The amount of fines originates from cement, possibly fly ashes, micro silica etc., and to a smaller extent, from the sand and gravel materials.

There is both a widespread economic and technical need of reducing this amount of fines. For one thing, the amount of fines in concrete and mortar to a large extent adds up to the costs of these materials, and for another, there is a considerably technical need of obtaining improved properties of concrete and mortar in fresh as well as in hardened condition. The improved properties are i.a. of a rheological nature. Furthermore it is desirable that concrete and mortar must be self-compacting, whereby these materials should show extreme high flow, and ability to fill as well as internal stability, in order that the material is not segregated in a water and powder phase.

The closest related prior art is described in DK 173458 B1. This reference discloses a segregation robust, self-leveling, self-compacting concrete with "High Performance" properties. This concrete is manufactured by adding 2-10% of palygorskite or sepiolite having a length/diameter ratio (aspect ratio) of more than 35. The purpose of adding palygorskite or sepiolite is to counteract or reduce defects or flaws, which may occur during hardening of especially High Performance concretes. As palygorskite increases the viscosity of the concrete and thereby deteriorates the flow properties, high doses of a superplasticizer are required. The defects and flaws stated are related to the concrete during hardening only and can be binding defects between paste/aggregate/reinforcement, irregularities in the structure of the paste, microscopic and macroscopic shortcomings, non-uniform distribution of the coarse aggregate, poor quality of the air void system and lack of hydration of cement grains locally in the cement paste. In DK 173458 B1, it is furthermore mentioned that when using laminar silicate minerals, including smectite, the desired effect, as provided when using palygorskite, is not obtained. A disadvantage of this prior art is that it is necessary to use higher levels of cost-increasing superplasticizers in order to obtain the desired effect of palygorskite.

Another disadvantage of using palygorskite is that it has been found to be carcinogenic in animal studies (cf. e.g. IARC Monographs Programme on the Evaluation of Carcinogenic Risks to Humans, vol: 68 (1997) (p245)).

EP 0467483 A1 discloses a method of making a stone foundation being impervious to water. By this prior art method, a mixture of graded aggregate (sand and gravel), mineral binder, bentonite and water is prepared. The bentonite used is preferably an activated bentonite and can be used as a dry additive or as a slurry in water after swelling for up to 24 hours. The mixture of the aggregate, mineral binder, bentonite and water requires the use of compaction to a degree of compaction of at least Proctor 98%, using e.g. a roller.

U.S. Pat. No. 3,832,193 discloses a refractory composition comprising refractory particles, water, diammonium phosphate and an acid or acid salt mixed therewith in an amount to give a pH below 7 and not less than 3. As refractory particles are mentioned i.a. bentonite. Diammonium phosphate liberates vapours of ammonia when the material is wet or damp. The liberation of vapours of ammonia is prevented by adjusting the pH of the mixture to a value below 7.

US 2004/0016369 A1 relates to smectite slurries including slurries of bentonite which are fully activated by ion exchange with sodium ions, said slurries comprising one or more phosphonate additives in an amount of 0.5-15% by weight based on the weight of smectite. In US 2004/0016369 A1, it is furthermore stated that said slurries are useful in self-leveling cement floors and in pumpable concrete systems to prevent settling of aggregates and excessive bleeding.

None of these references, neither alone nor in combination, anticipate an additive for a self-compacting concrete or mortar which allows the reduction of the amount of fines in said concrete or mortar by preventing the tendency of segregation of such concretes or mortars.

The object of the present invention is to improve the rheological properties of the self-compacting concretes and the mortars in fresh as well as in setting condition, i.e. from the time of mixing until final setting occurs, typically after 5-10 hours at 20° C.

Another object of the present invention is to prepare a self-compacting concrete or mortar with a reduced amount of fines and with a reduced content of superplasticizers.

A further object of the present invention is to avoid any health risks, which may be connected to the use of palygorskite.

Surprisingly, it has now been found that the above can be achieved by adding a small amount of additive according to the invention during the mixing of concrete or mortar having a reduced amount of fines. In this manner, a self-compacting concrete or mortar is prepared, which is resistant to segregation, so that the concrete or the mortar is not segregated in a water and powder phase.

Furthermore, it has surprisingly been found that the use of the additive according to the invention when mixing concrete and mortar results in a number of advantages of both an economic as well as an applied technical nature. These advantages can be characterised as follows:

1. By the use of the additive according to the invention, the amount of fines can be reduced resulting in a reduced cost price for the concrete.
2. The additive makes it possible to prepare robust self-compacting concretes (SCC) within all strength classes with a typical flow diameter >640 mm.
3. The additive according to the invention makes it possible to prepare robust self-compacting construction concretes (for vertical and/or complicated castings with closely spaced reinforcement) with extreme flow properties (flow diameter >700 mm).
4. The additive according to the invention provides concrete and mortar with a high internal stability so that the concrete or mortar tolerates higher pumping pressures without separating into a water and solid phase.
5. The additive according to the invention improves the rheology of concrete and mortar so that a minor variation of the water content does not influence the consistency.

6. The additive according to the invention ensures that the concrete or mortar product shows stable, plastic viscosity, i.e. a greater robustness.
7. When added to concretes or mortars, the additive according to the invention can eliminate the segregation, where segregation has already been observed, the additive according to the invention functioning as a kind of "repair material".
8. The additive according to the invention provides concretes prepared with white Portland cement with considerably improved rheologic properties, which until now has not been possible.

SUMMARY OF THE INVENTION

In accordance with one aspect of the present invention, a process is provided for the preparation an additive for a self-compacting concrete or mortar, whereby a type of clay containing clay minerals selected from the groups of smectite, vermiculite and/or chlorite during stirring, and adjusting of pH to 6.5-8, preferably 7, is suspended in water in an amount of 5-30, preferably 8-20, and more preferably 10-12% by weight of dry solid to obtain a consistency, which matches the dosing equipment used for dosing the additive when mixing concrete or mortar, whereafter the slurry is left for maturing for 1-7 days, preferably 1-2 days with stirring, before use. Before initiating the above stirring in connection with the suspension, the clay and water should preferably be left for so long (preferably from a few hours, e.g. 2-5 hours, to 24 hours or longer) in order to the clay being swelled or softened sufficiently to make stirring possible without mechanical problems with the stirring device or machinery.

In accordance with another aspect of the present invention, an additive for a self-compacting concrete or mortar has been provided, comprising an aqueous suspension matured and stabilised for 1-7 days, preferably 1-2 days, and having a consistency adapted to the dosing equipment, which is used for dosing the additive when mixing concrete or mortar, and having a pH of 6.5-8, preferably 7, and containing 5-30, preferably 8-20, and more preferably 10-12% by weight of dry solid of a type of clay cornprising clay minerals selected from the smectite, vermiculite and/or chlorite groups.

In accordance with a third aspect of the present invention, the use of an additive for a self-compacting concrete or mortar has been provided, comprising an aqueous suspension matured and stabilised for 1-7 days, preferably 1-2 days, and having a consistency adapted to the dosing equipment, which is used for dosing the additive when mixing concrete or mortar, and having a pH of 6.5-8, preferably 7, and containing 5-30, preferably 8-20, and more preferably 10-12% by weight of dry solid of a type of clay comprising clay minerals selected from the smectite, vermiculite and/or chlorite groups in an amount of 0.1-0.4, preferably 0.2-0.3, and especially approx. 0.25% by weight calculated on the basis of the amount of dry solid of the type of clay in relation to the amount of powder (amount of binder) in the concrete or mortar.

In accordance with a fourth aspect according to the invention, a self-compacting concrete or mortar has been provided with a reduced amount of fines and resistance to segregation comprising an additive consisting of an aqueous suspension matured and stabilised for 1-7 days, preferably 1-2 days, and having a consistency adapted to the dosing equipment, which is used for dosing the additive when mixing concrete or mortar, and having a pH of 6.5-8, preferably 7, and containing 5-30, preferably 8-20, and more preferably 10-12% by weight of dry solid of a type of clay comprising clay minerals selected from the smectite, vermiculite and/or chlorite groups in addition to the conventionally employed components in concrete or mortar, in an amount of 0.1-0.4, preferably 0.2-0.3, and especially approx. 0.25% by weight calculated on the basis of the amount of dry solid of the type of clay in relation to the powder content (amount of binder) in the concrete or mortar.

Further aspects of the invention will appear from the attached dependent patent claims.

The scope of the applicability of the invention will appear from the following detailed description. However, it is to be understood that the detailed description and the specific examples, even though they state preferred embodiments of the invention, are only stated as illustration, as various changes and modifications within the scope of the invention would be apparent to the person skilled in the art from the detailed description.

DETAILED DESCRIPTION OF THE INVENTION

The preferred type of clay is a bentonite type of clay, where the most common clay minerals derive from the smectite group and are predominantly montmorillonite. Besides the clay minerals, bentonite may contain microscopic crystals, of e.g. carbonates, feldspar, calcite, pyrite and quartz.

Concrete and mortar basically consist of gravel, sand and fines with an admixture of various additives and water. The fines include binders and fines from aggregates. The binder consists above all of cement, but also of other admixtures having a puzzolane effect, such as fly ash and micro silica. The additives can be plasticizers, superplasticizers, air-entraining agents, etc. having the purpose of improving the properties of the concrete or the mortar. The difference between concrete and mortar is the maximum grain size of the sand and gravel. If this grain size is more than 4 mm, the material is described as concrete, whereas by grain sizes below 4 mm the material is described as mortar. Together sand and gravel are designated as aggregate.

The additive according to the invention is prepared by suspending the type of clay desired to be used, e.g. bentonite, in tanks, basins or the like supplied with stirring. To reduce costs, the clay is preferably unrefined with a natural content of water, stones, gravel or other material, which is separated from the type of clay by sedimentation/filtration. The concentration of solid matter of the type of clay in the water is adjusted to a value of 5-30, preferably 8-20, and more preferably 10-12% by weight to obtain a desired consistency. The pH-value of the suspension can, if necessary, be adjusted to 6.5-8, preferably 7, by adding acid or base. Nitric acid, sulfuric acid, formic acid or phosphoric acid can, among others, be used as an acid, and calcium hydroxide, sodium hydroxide, or sodium carbonate can be used as a base. The additive according to the invention has to mature for 1 to 7 days, preferably 1 to 2 days. In order to prevent that the type of clay is precipitated, the maturing is carried out during stirring. The maturing period is significant to the effect of the additive. Standing for a longer time than the necessary maturing period has neither a negative nor a positive influence on the effect of the additive.

The additive according to the present invention can be used in concretes of all compressive strength classes from C4 to C100 (regarding compressive strength classes, cf. DS/EN 206-1:2002).

The invention is described in greater detail below in connection with the examples. The purpose of the examples is exclusively to illustrate the invention, the scope of which is specified by the attached claims:

EXAMPLES

Example 1

Strength class C25, passive exposure class
Consistency: 650 mm (flow diameter)
Water/cement ratio: 0.51
Air content: 6.5%
$D_{max}$=16 mm (maximum nominal upper aggregate size)
Mix design of concrete:

| | |
|---|---|
| Cement, CEM I 52.5 N | 240 kg/m³ |
| Fly ash | 50 kg/m³ |
| Water | 120 kg/m³ |
| Sand, 0/4 mm | 830 kg/m³ |
| Coarse aggregates 4/8 mm + 8/16 mm | 985 kg/m³ |
| Bentonite suspension, 1.9% of the powder content | 5.5 kg/m³ |
| Air-entraining admixture, 0.09% of the powder content | 0.26 kg/m³ |
| Plasticizer, 0.4% of the powder content | 1.16 kg/m³ |
| Superplasticizer (polycarboxylates), 0.9% of the powder content | 2.61 kg/m³ |
| 1 m³ concrete - totally | 2,235 kg |

Example 2

Strength class C35, aggressive exposure class
Consistency: 720 mm (flow diameter)
Water/cement ratio: 0.42
Air content: 6.5%
$D_{max}$=16 mm (maximum nominal upper aggregate size)
Mix design of concrete:

| | |
|---|---|
| Cement, White CEM I 52.5 N | 388 kg/m³ |
| Water | 163 kg/m³ |
| Sand, 0/4 mm | 780 kg/m³ |
| Coarse aggregates 4/8 mm + 8/16 mm | 1,040 kg/m³ |
| Bentonite suspension, 1.9% of the powder content | 7.40 kg/m³ |
| Air-entraining admixture, 0.05% of the powder content | 0.19 kg/m³ |
| Superplasticizer (polycarboxylate), 0.7% of the powder content | 2.72 kg/m³ |
| 1 m³ concrete - totally | 2,381 kg |

Example 3

Strength class C16, passive exposure class
Consistency: 670 mm (flow diameter)
Water/Cement ratio: 0.77
Air content: 5.5%
$D_{max}$=16 mm
Mix design of concrete:

| | |
|---|---|
| Cement, CEM I 52.5 N | 170 kg/m³ |
| Fly ash | 70 kg/m³ |
| Water | 158 kg/m³ |
| Sand, 0/4 mm | 890 kg/m³ |
| Coarse aggregate 8/16 mm | 935 kg/m³ |
| Bentonite suspension, 2.9% of the powder content | 7.00 kg/m³ |
| Air-entraining admixture, 0.10% of the powder content | 0.24 kg/m³ |
| Plasticizer, 0.50% of the powder content | 1.20 kg/m³ |
| Superplasticizer (polycarboxylates), 0.90% of the powder content | 2.16 kg/m³ |
| 1 m³ concrete - totally approx. | 2,234 kg |

The invention being thus described, it will be obvious that the same may be varied in many ways. Such variations are not to be regarded as a departure from the scope of the invention, and all such modifications as would be obvious to the person skilled in the art, are intended to be included within the scope of the following claims.

The invention claimed is:

1. A self-compacting concrete or mortar consisting essentially of cement pozzolans, coarse aggregates, sand, non-pozzolanic mineral fines, plasticizers, superplasticizers and air-entraining agents, and water; and an additive for reducing the need for fines and superplasticizers, wherein said additive is a suspension of clay in water matured for 1-7 days and having a pH of 6.5-8, and containing 5-30 wt % of dry solid of the clay, wherein the clay is selected from the group consisting of smectite, vermiculite and chlorite, and the amount of dry solid of the clay is 0.1-0.4 wt % in relation to the amount of powder binder in the concrete or mortar.

2. The self-compacting concrete or mortar according to claim 1, wherein said clay contains 50-90 wt % of said clay minerals.

3. The self-compacting concrete or mortar according to claim 1, wherein the clay minerals comprise smectite.

4. The self-compacting concrete or mortar according to claim 1, wherein 50-90 wt % of said clay mineral is montmorillonite.

5. The self-compacting concrete or mortar according to claim 1, wherein the clay is bentonite clay.

6. The self-compacting concrete or mortar according to claim 1, wherein the binder is white Portland cement.

7. The self-compacting concrete or mortar according to claim 1, wherein the pozzolans comprise fly ash or micro silica.

8. The self-compacting concrete or mortar according to claim 2, wherein said clay contains 60-80 wt % of said clay minerals.

9. The self-compacting concrete or mortar according to claim 8, wherein said clay contains 70-75 wt % of said clay minerals.

10. The self-compacting concrete or mortar according to claim 9, wherein said clay contains 75 wt % of said clay minerals.

11. The self-compacting concrete or mortar according to claim 4, wherein 60-80 wt % by weight of said clay mineral is montmorillonite.

12. The self-compacting concrete or mortar according to claim 11, wherein 70 wt % of said clay mineral is montmorillonite.

13. The self-compacting concrete or mortar according to claim 5, wherein the bentonite clay is calcium bentonite.

14. The self-compacting concrete or mortar according to claim 1, wherein said clay in water suspension has matured for 1-2 days.

15. The self-compacting concrete or mortar according to claim 1, wherein said clay in water suspension has a pH of 7.

16. The self-compacting concrete or mortar according to claim 1, wherein said clay in water suspension contains 8-20 wt % by weight of dry solid.

17. The self-compacting concrete or mortar according to claim 16, wherein said clay in water suspension contains 10-12 wt % by weight of dry solid.

18. The self-compacting concrete or mortar according to claim 1, wherein the amount of dry solid of the clay is 0.2-0.3 wt % in relation to the amount of powder binder in the concrete or mortar.

19. The self-compacting concrete or mortar according to claim 18, wherein the amount of dry solid of the clay is 0.25 wt % in relation to the amount of powder binder in the concrete or mortar.

* * * * *